May 22, 1951
R. F. REDEMSKE
2,553,786
GYROSTABILIZING SYSTEM
Filed Oct. 8, 1945
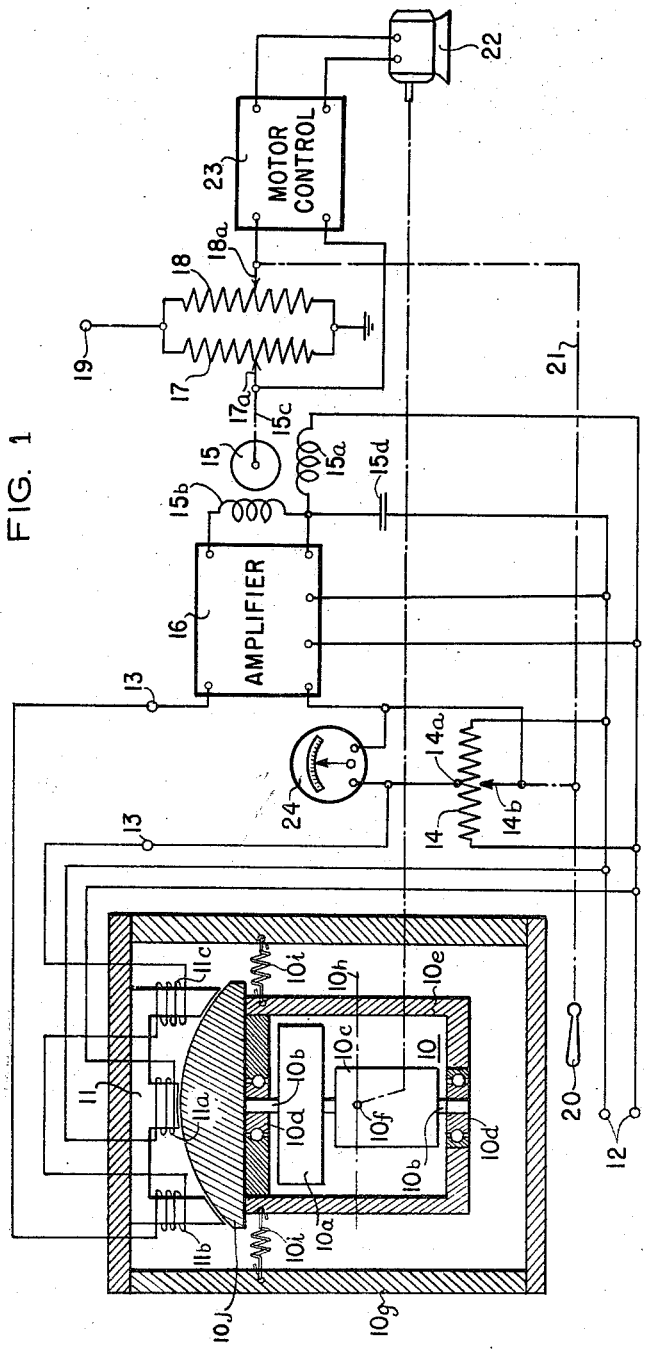
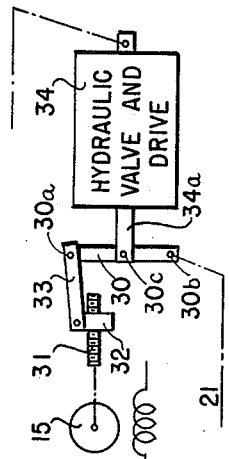
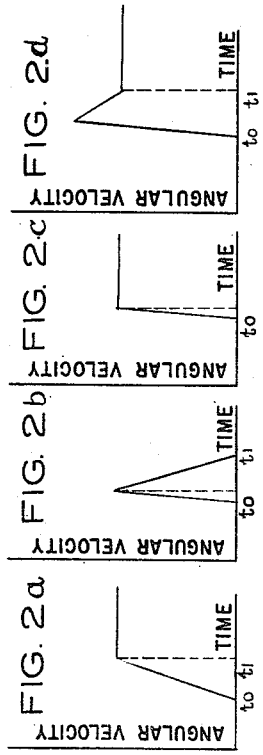
INVENTOR.
RALPH F. REDEMSKE
BY Mueller, Dodds & Mason
ATTORNEYS Patented May 22, 1951

2,553,786

UNITED STATES PATENT OFFICE 2,553,786

GYROSTABILIZING SYSTEM

Ralph F. Redemske, Huntington Station, N. Y., assignor to Fairchild Camera and Instrument Corporation, a corporation of Delaware Application October 8, 1945, Serial No. 621,069

13 Claims. (Cl. 318—31)

This invention relates to gyro-stabilizing systems and, while it is of general application, it is particularly suitable to the stabilization of an aircraft turret-gun platform in a given attitude in space or with a given angular velocity about one or more given axes, or both, irrespective of relative motion of the supporting aircraft.

The present invention constitutes an improvement on a copending application of H. E. Hale, Serial No. 621,066, filed October 8, 1945, now abandoned, and assigned to the same assignee as the present application. In that aplication there is described and claimed a gyro-stabilizing system for stabilizing an object pivotally movable about a given axis comprising a rate-gyro adapted to be supported from the object with its pivotal axis and its spin axis lying in a plane at an angle to the given axis and means for deriving an effect varying with the pivotal movement of the rate-gyro. The system also includes integrating means responsive to such derived effect for producing pivotal movement of the object about the given axis of an amount determined by the time-integral of such effect and in a sense to reduce the pivotal movement of the rate-gyro, and means for modifying the response of the responsive means to such effect to establish a predetermined rate of pivotal movement of said object about such given axis.

In a system of the type described in the aforesaid application, if the sensitivity of the system is increased and the time-delay decreased beyond somewhat critical values, the system tends to overshoot or hunt; that is, it undergoes several oscillatory cycles before it reaches a stable condition of equilibrium. This overshooting or hunting is itself undesirable and, in the case of a stabilizing system applied to a gun turret, it also renders the system sensitive to outside vibration such as gun shock. Thus it presents the alternative compromise of designing the system for best stabilization but relatively poor control under gunfire or for good control under gunfire and relatively inferior stabilization. In practice, it has been customary to make the system sufficiently sensitive to facilitate tracking of the target by the gunner, which resulted in a certain amount of dispersion of the gunfire due to the effect of gun shock on the system. While the system of the aforesaid copending application is entirely satisfactory in many applications, there are certain installations in which it is desirable to be able to increase the sensitivity and to decrease the time-delay of the system to the maximum permissible limits while avoiding any oscillation or hunting. The present invention is directed to an improvement of the aforesaid gyro-stabilizing system in order to provide increased sensitivity and decreased time-delay while substantially avoiding hunting.

It is an object of the invention, therefore, to provide a new and improved gyro-stabilizing system by means of which either the position or the angular velocity of an object, or both, may be readily stabilized about a given axis.

It is another object of the invention to provide a new and improved gyro-stabilizing system which provides extremely high sensitivity and accuracy and a minimum time-delay while substantially avoiding oscillation or hunting.

In accordance with the invention, a gyro-stabilizing system for stabilizing an object pivotally movable with respect to a support about a given axis comprises a rate-gyro adapted to be supported from the object with its pivotal axis and its spin axis lying in a plane at an angle to the given axis and means for deriving an effect varying with the pivotal movement of the rate-gyro. The system also includes integrating means responsive to such effect for producing a first displacement determined by the time-integral thereof, means for modifying the response of the responsive means and for simultaneously producing a second displacement, and means responsive jointly to such displacements for establishing a predetermined rate of pivotal movement of the object in space about such given axis substantially independently of relative pivotal movement of the support about such axis.

Further in accordance with the invention, a gyro-stabilizing system for stablizing an object pivotally movable about a given axis comprises a rate-gyro of the type described, means for deriving an electrical signal varying with the pivotal movement of the rate-gyro, means independent of said rate-gyro for developing a second electrical signal of preselected value, and means responsive jointly to the two signals for establishing a predetermined rate of pivotal movement of the object varying with the value of the second signal.

For a better understanding of the invention, together with other and further objects thereof, reference is had to the following description taken in connection with the accompanying drawings, while its scope will be pointed out in the appended claims.

Referring now to the drawing, Fig. 1 is a diagram, partially schematic, of a gyro-stabilizing system embodying the invention; Figs. 2a–2d, inclusive, are graphs of certain operating characteristics of the system of Fig. 1 to aid in the explanation of the operation thereof; while Fig. 3 is a fragmentary diagram of a modified form of the gyro-stabilizing system of the invention.

Referring now to Fig. 1 of the drawings, there is represented a gyro-stabilizing system for stabilizing an object pivotally movable with respect to a support about a given axis. This system comprises a rate-gyro 10 including a gyroscopic element 10a mounted on a common shaft 10b with, and driven by, a motor 10c. The shaft 10b is pivoted in anti-friction bearings 10d, 10d in a casing 10e which is pivoted about an axis 10f normal to the plane of the drawing from an outer housing or casing 10g. The axis of the shaft 10b, which is the spin axis of the gyroscope, and the pivotal axis 10f lie in a plane normal to the axis of stabilization 10h. The housing 10g may comprise the object to be stabilized or it may be fixedly supported from the object to be stabilized and the object to be stabilized is, in turn, pivotally supported about the axis 10h from a support, for example an aircraft (not shown). Movement of the casing 10e about the axis 10f from its central or neutral position is restrained by a pair of springs 10i, 10i, interconnecting opposite walls of the casing 10e with adjacent walls of the housing 10g. By the term "rate-gyro" is meant a gyroscopic element which has a restrained movement about its pivotal axes, preferably about a single axis, rather than being mounted in a conventional universal gimbal support, so that angular movement of the gyroscope about a first axis normal to the plane of its spin axis and its pivotal axis causes it to precess about its pivotal axis, this precession being representative of its angular velocity about such first axis.

The system also includes means for deriving an effect varying with the pivotal movement of the rate-gyro about its pivotal axis 10f. This means may be in the form of a pick-up E-magnet 11 provided with a primary or inducing winding 11a on its central core connected to a suitable source of alternating current, such as supply terminals 12 which may be connected to a supply source of any suitable frequency. On the outer cores of the magnet 11 are disposed a pair of windings 11b and 11c which are connected in series opposition in an output circuit connected to terminals 13, 13. The coupling between the primary winding 11a and the secondary windings 11b and 11c is determined by the position of a laminated magnetic armature 10j carried by the casing 10c. With this arrangement, as explained hereinafter, there is developed at the terminals 13 an effect, specifically an electrical signal, which varies in polarity and magnitude in accordance with the sense and magnitude of the angular velocity of the gyroscopic element about the pivotal axis 10f.

The gyro-stabilizing system also includes integrating means responsive to the effect developed by the rate-gyro 10 for producing a first displacement determined by the time-integral thereof and means for modifying the response of the responsive means and for simultaneously producing a second displacement. Specifically, the means for modifying the response of the responsive means is in the form of means for developing a second electrical signal, for example a voltage divider 14 provided with a fixed intermediate contact 14a and an adjustable contact 14b, the divider 14 being connected across the supply-circuit terminals 12. The response-modifying means also comprises a circuit including in series the signal-deriving means, that is the windings 11b and 11c in series opposition, and the means for developing the second signal, that is the portion of the voltage divider 14 between the contacts 14a and 14b. If desired, signal-utilization means such as a meter 24 may be connected between the terminals 14a and 14b for developing an effect or representative of the angular velocity of the rate-gyro.

The system also includes integrating means responsive to the resultant signal of the circuit including the terminals 13 and the contacts 14a, 14b, that is to the algebraic sum of the two signals there appearing, for producing an effect or displacement determined by the integral of such sum. This integrating means may be of any suitable type but is shown, by way of example, as comprising a two-phase motor 15 having a first phase winding 15a connected to the supply circuit terminals 12 through a phase-shifting condenser 15d and a second phase winding 15b connected through an amplifier 16 to the circuit including one of the terminals 13 and the adjustable contact 14b.

The gyro-stabilizing system also includes means for effecting two displacements which may be either electrical, as the charge on a condenser, or, as illustrated, mechanical. This means includes voltage divider means such as a pair of voltage dividers 17 and 18 connected in parallel across a suitable electrical supply circuit 19 and provided with adjustable contacts 17a and 18a, respectively. The integrating motor 15 is connected by way of a shaft 15c to effect a first displacement, specifically an adjustment of the contact 17a of the voltage divider means, while there is provided a manually operable means such as a handle 20, connected by way of a mechanism indicated schematically at 21, to adjust the contact 14b of the voltage divider 14 and constituting also means for effecting a second displacement, that is, for adjusting the other contact 18a of the voltage divider means.

The gyro-stabilizing system also includes means responsive jointly to the displacements of the adjustable contacts 17a, 18a, specifically to the difference of potentials of such contacts, for establishing a predetermined rate of pivotal movement of the object including the casing 10g in space about the given axis 10h substantially independently of the relative pivotal movement of the support about such axis. This latter means may be in the form of a reversible motor 22 actuated under the control of a motor-control unit 23 at a speed proportional to the difference in potential of the contacts 17a and 18a. It will be understood that the motor control 23 may be of any of several well-known types which is effective to apply to the motor 22 an operating voltage varying in polarity and magnitude in accordance with the polarity and magnitude of the difference of potential obtaining between the contacts 17a and 18a.

In explaining the operation of the gyro-stabilizing system of the invention, it will be assumed initially that the system is in equilibrium with the contact 14b of voltage divider 14 at the same potential as the stationary contact 14a and with the adjustable contacts 17a and 18a at the same electrical potential. Under these conditions, the voltages induced in the windings 11b and 11c are equal so that their difference impressed on the terminals is zero, the input to the amplifier 16 is zero and the motor 15 remains at rest. Under these conditions also, movement of the object including the casing 10g about the stabilization axis 10h, due to movements of its supporting structure, is effective in a well-known manner to cause the gyroscopic element 10a to precess about the axis 10f. The pivotal movement of the magnetic armature 10j carried by casing 10e unbalances the voltages induced in the windings 11b, 11c and the difference or unbalance voltage is impressed through the circuit terminals 13 upon the input circuit of the amplifier 16. The integrating motor 15 thereupon rotates at a speed proportional to the magnitude of this unbalance voltage so that the total rotational movement of its shaft 15c is the time-integral of such voltage. This displacement of adjustable contact 17a applies a corresponding unbalance potential to the motor control 23 which is effective to energize the motor 22 to cause rotational movement of the object including the housing 10g about the stabilization axis 10h in a sense to reduce the initial pivotal movement which initiated the operation of the system.

Thus it is seen that the stabilization system so far described is effectively a position or attitude stabilizing system, in that it produces a corrective pivotal movement of the rate-gyro 10 and its supporting platform equal to the time integral of its angular velocity, which is equal to its total displacement throughout this period of pivotal movement. This method of operation is to be contrasted with prior art stabilization systems which produce a corrective pivotal movement at a constant rate upon precession of the gyroscope by a predetermined minimum amount representing a minimum angular velocity about its pivotal axis. It is apparent that such a method of position-stabilization is inherently inaccurate due, among other factors, to the minimum "slip" or regulation required to maintain the stabilizing system in operation. However, the "memory" feature of the integrating means of the present invention avoids these errors.

Neglecting for the present the mechanical interconnection between the manually adjustable knob 20 and the adjustable contact 18a, the gyro-stabilizing system described is also effective to establish a predetermined rate of pivotal movement of the rate-gyro and its supporting platform, that is to stabilize the system at a given constant angular velocity, about its axis of stabilization 10h. This characteristic is provided by the connection of the knob 20 and the adjustable contact 14b. Assuming that the system is in equilibrium, adjustment of the contact 14b by the knob 20 introduces into the control circuit connected to the integrating motor 15 a voltage which simulates an unbalance voltage of the rate-gyro 10 and causes the motor 22 to rotate the object including the housing 10g about the axis 10h at such an angular velocity as to develop in the pick-up windings 11b, 11c an electrical signal equal and opposite to that appearing between the contacts 14a and 14b, as described above. However, in this instance, the system does not automatically rebalance itself at zero angular velocity since the unbalance voltage inserted in series with that developed by the rate-gyro is maintained between the contacts 14a and 14b.

Assuming, therefore, that there was no undesired initial velocity of the elements about the axis 10h, adjustment of the knob 20, as described, causes the system to establish pivotal movement of the elements about the axis 10h at a constant angular velocity such that the signal developed by the rate-gyro has a value equal and opposite to that between contacts 14a and 14b. This velocity may be maintained at any value within the range of operation of the system. The position of contact 18a has a definite mechanical relationship with respect to that of the contact 14b, as determined by the common adjusting mechanism 21, such that the speed of the motor 22 has a specific relationship to the angular velocity in space of the gyroscope platform as represented by the signal developed between the contacts 14a and 14b. For example, if the voltage divider 14 has a linear displacement-voltage characteristic, it will generally be necessary to construct the voltage divider 18 with a suitably shaped or tapered displacement-voltage characteristic to develop the proper relation between the speed of the motor 22 and the signal developed by the rate-gyro 10.

The characteristic of the system described is particularly useful in the stabilization of a gunsight platform, as the relative movement between the sight and the target usually closely approximates a constant angular velocity. By an appropriate adjustment of the knob 20, the gyro-stabilizing system may be made to establish this constant angular velocity between the gunsight and the target so that the gunner need subsequently make adjustment only for slight deviations of the angular velocity of the sight and target from constancy. This operation may be termed rate-stabilization as distinguished from position-stabilization. It will be apparent that the action of the system due to undesired relative movements of the support for the object including the housing 10g about the axis 10h will be superimposed upon that due to manual adjustment of the contact 14b by the knob 20 so that the rate-stabilization is effected independently of such undesired relative movements of the object support.

The characteristics of the system so far described is represented in Fig. 2a, in which it is assumed that the adjustment of the knob 14b is made at the time $t_0$. The time $t_0$—$t_1$ represents the time required for the integrating motor 15 to act to establish the final rate of angular velocity of the object about axis 10h which, when reached, is thereafter maintained substantially constant.

Assuming that the connection between manual knob 20 and the adjustable contact 14b is broken and that between the knob 20 and the adjustable contact 18a is established and assuming that the system is initially in a condition of equilibrium and assuming further that the movable object is considerably over-powered by the motor 22, if now the knob 20 is adjusted to adjust the contact 18a, the motor control 23 and motor 22 will act extremely rapidly to adjust the object including the housing 10g about the axis 10h to a rate of angular velocity corresponding to the adjustment of the contact 18a. However, this angular velocity of the rate-gyro 10 introduces an unbalance voltage in the circuit 13 which causes the integrating motor 15 to operate to adjust the contact 17a to reduce the potential difference between the contacts 17a and 18a to zero. This characteristic is represented in Fig. 2b in which the time $t_0$ represents the time of adjustment of contact 18a and the time $t_1$ represents the time at which the integrating motor 15 has operated to discontinue the operation of the motor 22. It will be seen that the net result of this adjustment is only to change the position of the rate-gyro 10 but that no permanent angular velocity is established. It is seen that the angular velocity of the system corresponding to the setting of contact 18a is reached extremely rapidly, the speed being limited only by the speed of operation of control unit 23 and motor 22. It is also seen that the time $t_0$—$t_1$ of Fig. 2b required to reduce the angular velocity of the rate gyro 10 to zero is equal to the time $t_0$—$t_1$ of Fig. 2a required by the integrating motor 15 to establish the final rate of angular velocity, both of these times being that corresponding to the time-delay of the integrating means.

If now the manually operable knob is connected to both the adjustable contacts 14b and 18a and the adjustment of the contact 18a is made in a sense opposite to, and of a magnitude approximately equal to, the displacement of the adjustable contact 17a normally resulting from a corresponding action of the response-modifying means, that is a corresponding adjustment of the contact 14b of voltage divider 14, the motor control 23 and motor 22 will substantially instantaneously establish the final desired rate of pivotal movement of the rate-gyro 10 about the axis 10h. Hence the unbalance voltage induced in the pick-up windings 11b, 11c and impressed on the circuit terminals 13 is exactly equal and opposite to the electrical signal appearing between the contacts 14a and 14b due to the adjustment of the contact 14b so that the input to the integrating means comprising the motor 15 and the amplifier 16 is zero and the integrating means does not operate. This operation is represented in Fig. 2c in which time $t_0$ represents the time of simultaneous operation of the adjustable contacts 14b and 18a. It is seen that the object reaches its final angular velocity about the axis 10h extremely rapidly and thereafter maintains this velocity.

The stabilization of the objects including the housing 10g by the rate-gyro 10 can be still further improved by altering the system constants to make the rate of pivotal movement of the rate-gyro 10 about the axis 10h produced by a given adjustment of the contact 18a by the knob 20 somewhat greater than the final rate which would independently be produced by a corresponding adjustment of the contact 14b by the knob 20. This condition is represented by Fig. 2d in which the time $t_0$ represents the time of simultaneous adjustment of the contacts 14b and 18a. It is seen that the object is given an initial angular velocity extremely rapidly and substantially in excess of its final angular velocity and that this initial velocity is decreased in the interval $t_0$—$t_1$ at a rate dependent upon the time constant of the integrating means including the motor 15 and amplifier 16. At the point $t_1$, the contact 17a has been adjusted so that the difference in potential between the contacts 17a and 18a corresponds to an angular velocity of the rate-gyro about the axis 10h determined by the setting of the adjustable contact 14b. This type of operating characteristic when applied to a gunsight is known as "aided tracking" and enables the gunner rapidly to set his sight on a target and establish a predetermined angular velocity of the line-of-sight substantially immediately after the sight has first been set on a target.

It has been found that a gunner can track a target better with velocity stabilization than with simple positional stabilization but that the combination of these two facilitates most accurate tracking. Consequently it is desirable to have every adjustment of the control knob 20 change not only the angular velocity but the position of the gyroscope platform. Thus Fig. 2b indicates that, if only the positional control contact 18a were used, the net result would be a change in position only. The amount of this change is represented by the time-integral of the area under the curve of Fig. 2b. Consequently when the angular velocity called for by movement of contact 18a exceeds that called for by movement of contact 14b, there is a temporary excess angular velocity given to the gyroscope platform for a period of time but this excess will be represented only by a positional change in attitude of the platform similar to that represented by Fig. 2b. The amount of this positional change is represented by the triangular area of Fig. 2d during the interval $t_0$—$t_1$. Consequently this system satisfies the conditions for aided tracking by providing both a positional component and an angular velocity component of platform motion resulting from a given adjustment of the control knob 20.

The system described provides an extremely fast and sensitive or "stiff" control of the gun platform or turret by virtue of the positional control contact 18a, which effectively by-passes the amplifier and servo-motor, while at the same time an accurate and stable stabilization is effected through the amplifier and servo-motor which is relatively insensitive to gun shock or other vibrations, due to the time constant of amplifier and servo-motor.

In the system described either the output signal of the rate-gyro 10 appearing at the terminals 13, 13 or that appearing between the contacts 14a and 14b constitutes an effect representative of the rate of pivotal movement of the rate-gyro 10 and may be utilized for indicating, recording or controlling operations. This feature is advantageous in that it provides a source of signal independent of that developed by the rate-gyro 10, which is an important factor in reducing oscillations or hunting of any system utilizing this signal. In addition, it gives an indication of what the angular velocity in space of the rate-gyro will be a short interval before such angular velocity has been actually attained, so that in effect it is an anticipatory signal.

In Fig. 3 is represented a fragmentary diagram of a modified form of gyro-stabilizing system in which the voltage divider means 17, 18 is replaced by a differential mechanism such as a lever 30 having two operating connections at points 30a and 30b at opposite ends thereof. The integrating means comprising the motor 15 operates through a threaded shaft 31, traveling nut 32 and link 33 to produce a first displacement, specifically to adjust the connection point 30a by an amount determined by the time-integral of the resultant of the signals at the terminals 13 and between the contacts 14a, 14b. The manually operable knob is connected by way of mechanism 21 to the other connection point 30b so that, upon adjustment of the contact 14b to modify the response of the integrating means, the connection point 30b is simultaneously adjusted. In this modification the means for establishing a position or rate-stabilization of the object including the housing 10g about the stabilization axis 10h comprises a fluid power means controlled by the lever 30, for example a pneumatic or hydraulic valve and drive unit 34 having a control element 34a connected to an intermediate connection point 30c of lever 30. The hydraulic valve and drive 34 may be of any of many well-known hydraulic systems effective to develop a power displacement varying with the adjustment of a control element such as a control link 34a. The principles of operation of the system of Fig. 3 are entirely similar to those of the system of Fig. 1, described above, and need not be repeated.

Thus it is seen that the improved gyro-stabilizing system of the invention provides rapid and accurate position and rate-stabilization of an object about a stabilization axis and at the same time is substantially free from oscillation or hunting. This characteristic is what is sometimes termed a "stiff control."

It will be understood that, in case it is desired to stabilize the object including the casing 10g about any other axis, the stabilization system described will be duplicated for such other axis. One such duplication for the control of an aircraft turret gun about its azimuth and elevation axes is described in the aforesaid copending Hale application. Furthermore, it will be understood that the invention is applicable to the stabilization of any platform through suitable servo-motors; for example it may be applied to the operation of the control surfaces of an aircraft, serving as a gyro-pilot to stabilize the attitude or angular velocity of the aircraft, or both.

While there have been described what are at present considered to be the preferred embodiments of the invention, it will be apparent to those skilled in the art that various changes and modifications may be made therein without departing from the spirit or scope of the invention.

What is claimed as new is:

1. A gyro-stabilizing system for stabilizing an object pivotally movable with respect to a support about a given axis comprising, a rate-gyro adapted to be supported from said object with its pivotal axis and its spin axis lying in a plane at an angle to said given axis, means for deriving an effect varying with the pivotal movement of said rate-gyro, integrating means responsive to said effect for producing a first displacement determined by the time-integral thereof, means for modifying the response of said responsive means and for simultaneously producing a second displacement, and means responsive jointly to said displacements for establishing a predetermined rate of pivotal movement of said object in space about said given axis substantially independently of relative pivotal movement of the support about said axis.

2. A gyro-stabilizing system for stabilizing an object pivotally movable with respect to a support about a given axis comprising, a rate-gyro adapted to be supported from said object with its pivotal axis and its spin axis lying in a plane at an angle to said given axis, means for deriving an electrical signal varying with the pivotal movement of said rate-gyro, means for developing a second electrical signal and simultaneously producing a first displacement, integrating means responsive to the algebraic sum of said electrical signals for producing a second displacement determined by the time-integral thereof, and means responsive jointly to said displacements for establishing a predetermined rate of pivotal movement of said object in space about said given axis substantially independently of relative pivotal movement of the support about said axis.

3. A gyro-stabilizing system for stabilizing an object pivotally movable with respect to a support about a given axis comprising, a rate-gyro adapted to be supported from said object with its pivotal axis and its spin axis lying in a plane at an angle to said given axis, means for deriving an electrical signal varying with the pivotal movement of said rate-gyro, a circuit including in series said signal-deriving means and means for developing a second electrical signal, said last-named means simultaneously producing a first displacement, integrating means responsive to the resultant signal of said circuit for producing a second displacement determined by the time-integral thereof, and means responsive jointly to said displacements for establishing a predetermined rate of pivotal movement of said object in space about said given axis substantially independently of relative pivotal movement of the support about said axis.

4. A gyro-stabilizing system for stabilizing an object pivotally movable with respect to a support about a given axis comprising, a rate-gyro adapted to be supported from said object with its pivotal axis and its spin axis lying in a plane at an angle to said given axis, means for deriving an electrical signal varying with the pivotal movement of said rate-gyro, a voltage divider having a fixed contact and an adjustable contact, a circuit including in series said signal-deriving means and the portion of said voltage divider between said contacts, integrating means responsive to the resultant signal of said circuit for producing a first displacement determined by the time-integral thereof, means for adjusting said adjustable contact and for simultaneously producing a second displacement, and means responsive jointly to said displacements for establishing a predetermined rate of pivotal movement of said object in space about said given axis substantially independently of relative pivotal movement of the support about said axis.

5. A gyro-stabilizing system for stabilizing an object pivotally movable with respect to a support about a given axis comprising, a rate-gyro adapted to be supported from said object with its pivotal axis and its spin axis lying in a plane at an angle to said given axis, means for deriving an effect varying with the pivotal movement of said rate-gyro, voltage divider means having two adjustable contacts, integrating means responsive to said effect for adjusting one of said contacts by an amount determined by the time-integral thereof, means for modifying the response of said responsive means and for simultaneously adjusting the other of said contacts, and means responsive to the difference in potential of said contacts for establishing a predetermined rate of pivotal movement of said object in space about said given axis substantially independently of relative pivotal movement of the support about said axis.

6. A gyro-stabilizing system for stabilizing an object pivotally movable with respect to a support about a given axis comprising, a rate-gyro adapted to be supported from said object with its pivotal axis and its spin axis lying in a plane at an angle to said given axis, means for deriving an effect varying with the pivotal movement of said rate-gyro, integrating means responsive to said effect for producing a first displacement determined by the time-integral thereof, means for modifying the response of said responsive means and for simultaneously producing a second displacement of a sense opposite to and a magnitude approximately equal to the first displacement normally resulting from a corresponding action of said response-modifying means, and means responsive jointly to said displacements for establishing a predetermined rate of pivotal movement of said object in space about said given axis substantially independently of relative pivotal movement of the support about said axis.

7. A gyro-stabilizing system for stabilizing an object pivotally movable with respect to a support about a given axis comprising, a rate-gyro adapted to be supported from said object with its pivotal axis and its spin axis lying in a plane at an angle to said given axis, means for deriving an effect varying with the pivotal movement of said rate-gyro, integrating means responsive to said effect for producing a first displacement determined by the time-integral thereof, means for modifying the response of said responsive means and for simultaneously producing a second displacement of a sense opposite to and a magnitude substantially greater than the first displacement normally resulting from a corresponding action of said response modifying means, and means responsive jointly to said displacements for establishing a predetermined rate of pivotal movement of said object in space about said given axis substantially independently of relative pivotal movement of the support about said axis.

8. A gyro-stabilizing system for stabilizing an object pivotally movable about a given axis comprising, a rate-gyro adapted to be supported from said object with its pivotal axis and its spin axis lying in a plane at an angle to said given axis, means for deriving an electrical signal varying with the pivotal movement of said rate-gyro, a circuit including in series said signal-deriving means and means independent of said rate-gyro for developing a second electrical signal of preselected value, and means responsive to the resultant signal of said circuit for establishing a predetermined rate of pivotal movement of said object varying with the value of said second signal.

9. A gyro-stabilizing system for stabilizing an object pivotally movable about a given axis comprising, a rate-gyro adapted to be supported from said object with its pivotal axis and its spin axis lying in a plane at an angle to said given axis, means for deriving an electrical signal varying with the pivotal movement of said rate-gyro, a voltage divider having a fixed contact and a contact adjustable independently of said rate-gyro to any preselected position, a circuit including in series said signal-deriving means and the portion of said voltage divider between said contacts, and means responsive to the resultant signal of said circuit for establishing a predetermined rate of pivotal movement of said object varying with the value of said second signal.

10. A gyro-stabilizing system for stabilizing an object pivotally movable with respect to a support about a given axis comprising, a rate-gyro adapted to be supported from said object with its pivotal axis and its spin axis lying in a plane at an angle to said given axis, means for deriving an effect varying with the pivotal movement of said rate-gyro, integrating means responsive to said effect for producing a first mechanical displacement determined by the time-integral thereof, means for modifying the response of said responsive means and for simultaneously producing a second mechanical displacement, and fluid power means responsive jointly to said displacements for establishing a predetermined rate of pivotal movement of said object in space about said given axis substantially independently of relative pivotal movement of the support about said axis.

11. A gyro-stabilizing system for stabilizing an object pivotally movable with respect to a support about a given axis comprising, a rate-gyro adapted to be supported from said object with its pivotal axis and its spin axis lying in a plane at an angle to said given axis, means for deriving an effect varying with the pivotal movement of said rate-gyro, a differential mechanism having two operating connections, integrating means responsive to said effect for adjusting one of said connections by an amount determined by the time-integral thereof, means for modifying the response of said responsive means and for simultaneously adjusting the other of said connections, and means actuated by said mechanism for establishing a predetermined rate of pivotal movement of said object in space about said given axis substantially independently of relative pivotal movement of the support about said axis.

12. A gyro-stabilizing system for stabilizing an object pivotally movable about a given axis comprising, a rate-gyro adapted to be supported from said object with its pivotal axis and its spin axis lying in a plane at an angle to said given axis, means for deriving an electrical signal varying with the pivotal movement of said rate-gyro, a circuit including in series said signal-deriving means and means independent of said rate-gyro for developing a second electrical signal of preselected value, means responsive to the resultant signal of said circuit for establishing a predetermined rate of pivotal movement of said object varying with the value of said second signal, and means responsive to said second signal for developing an effect representative of the rate of pivotal movement of said object.

13. A gyro-stabilizing system for stabilizing an object pivotally movable about a given axis comprising, a rate-gyro adapted to be supported from said object with its pivotal axis and its spin axis lying in a plane at an angle to said given axis, means for deriving an electrical signal varying with the pivotal movement of said rate-gyro, a voltage divider having a fixed contact and a contact adjustable independently of said rate-gyro to any preselected position, a circuit including in series said signal-deriving means and the portion of said voltage divider between said contacts, means responsive to the resultant signal of said circuit for establishing a predetermined rate of pivotal movement of said object varying with the value of said second signal, and means responsive to the signal between said contacts for developing an effect representative of the rate of pivotal movement of said object.

RALPH F. REDEMSKE.

REFERENCES CITED

The following references are of record in the file of this patent:

UNITED STATES PATENTS

| Number | Name | Date |
|---|---|---|
| 1,966,170 | Greene | July 10, 1934 |
| 2,014,825 | Watson | Sept. 17, 1935 |
| 2,267,682 | Fairchild et al. | Dec. 23, 1941 |
| 2,300,742 | Harrison et al. | Nov. 3, 1942 |